United States Patent
Mincigrucci et al.

(10) Patent No.: US 10,906,582 B2
(45) Date of Patent: Feb. 2, 2021

(54) METHOD FOR THE DRIVER ASSISTANCE OF A ROAD VEHICLE

(71) Applicant: FERRARI S.p.A., Modena (IT)

(72) Inventors: Francesca Mincigrucci, Formigine (IT); Fabio Tancredi, Modena (IT)

(73) Assignee: FERRARI S.P.A., Modena (IT)

( * ) Notice: Subject to any disclaimer, the term of this patent is extended or adjusted under 35 U.S.C. 154(b) by 309 days.

(21) Appl. No.: 16/143,122

(22) Filed: Sep. 26, 2018

(65) Prior Publication Data

US 2019/0092385 A1   Mar. 28, 2019

(30) Foreign Application Priority Data

Sep. 26, 2017   (IT) .......................... 102017000107326

(51) Int. Cl.
| | | |
|---|---|---|
| *B62D 5/04* | (2006.01) | |
| *B62D 6/10* | (2006.01) | |
| *B62D 15/02* | (2006.01) | |
| *B62D 6/00* | (2006.01) | |

(52) U.S. Cl.
CPC ............. *B62D 6/10* (2013.01); *B62D 5/0463* (2013.01); *B62D 6/002* (2013.01); *B62D 15/025* (2013.01)

(58) Field of Classification Search
CPC ........ B62D 6/10; B62D 15/025; B62D 6/002; B62D 5/0463; B62D 5/04
See application file for complete search history.

(56) References Cited

U.S. PATENT DOCUMENTS

| | | | |
|---|---|---|---|
| 2006/0041358 A1* | 2/2006 | Hara ................... | B62D 15/0245 701/41 |
| 2016/0288831 A1* | 10/2016 | Lee ........................ | B60W 30/10 |
| 2017/0088167 A1 | 3/2017 | Fujii et al. | |
| 2020/0239067 A1* | 7/2020 | Wu ....................... | B62D 15/025 |
| 2020/0282987 A1* | 9/2020 | Zhu ....................... | B60W 30/10 |

FOREIGN PATENT DOCUMENTS

| | | |
|---|---|---|
| EP | 1588922 A2 | 10/2005 |
| EP | 3153382 A1 | 4/2017 |

OTHER PUBLICATIONS

IT 201700107326 Search Report, dated Jun. 22, 2018.

* cited by examiner

*Primary Examiner* — Kevin Hurley
*Assistant Examiner* — Marlon A Arce
(74) *Attorney, Agent, or Firm* — Cantor Colburn LLP

(57) ABSTRACT

A method for the driver assistance of a road vehicle; the assistance method comprises the steps of: determining an actual steering angle of the front wheels; determining a desired steering angle of the front wheels; and changing the servo-assistance torque applied by a servo-assistance device to a steering system based on the actual steering angle and on the desired steering angle, so that the servo-assistance torque that is applied when a steering wheel is rotated in a first direction to change the actual steering angle causing it to approach the desired steering angle is greater than the servo-assistance torque that is applied when the steering wheel is rotated in a second direction, which is opposite to the first direction, to change the actual steering angle causing it to distance itself from the desired steering angle.

12 Claims, 3 Drawing Sheets

US 10,906,582 B2

METHOD FOR THE DRIVER ASSISTANCE OF A ROAD VEHICLE

CROSS-REFERENCE TO RELATED APPLICATIONS

This application claims priority from Italian Patent Application No. 102017000107326 filed on Sep. 26, 2017, the disclosure of which is incorporated by reference.

BACKGROUND

The invention relates to a method for the driver assistance of a road vehicle.

A modern road vehicle has different electronic driver assistance systems (for example ABS—anti-lock braking system, ASR—anti-slip regulation, ESP—electronic stability program . . . ), which allow the driver to drive the vehicle with greater safety, as they are capable of "correcting" possible driving mistakes by directly acting upon the dynamics of the vehicle (for example by changing the braking torque applied to the different wheels or by reducing the torque generated by the engine). However, currently available electronic driver assistance systems do not help the driver approach the the limits of the road vehicle (without exceeding them), as they autonomously intervene (i.e. without any control on the part of the driver) when the limits of the road vehicle are exceeded or are about to be exceeded, but do not provide any indication on how to (safely) approach the limits.

Patent application EP1588922A2 describes a lane-keep control system, wherein, if a vehicle steers away from a lane without the driver acting upon the steering wheel, the control system actively intervenes autonomously from the driver by applying a torque to the steering actuator in order to steer the vehicle back to the lane; in other words, if a vehicle steers away from a lane without the driver acting upon the steering wheel, the control system takes the place of the driver by turning the steering wheel in a manner that is completely independent of and autonomous from the action of the driver, so as to steer the vehicle back to the lane.

DESCRIPTION OF THE INVENTION

The object of the invention is to provide a method for the driver assistance of a road vehicle, which allows the driver to (safely) approach the limits of the road vehicle, especially when driving along a curve.

According to the invention, there is provided a method for the driver assistance of a road vehicle according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

DETAILED DESCRIPTION

Figure 1:
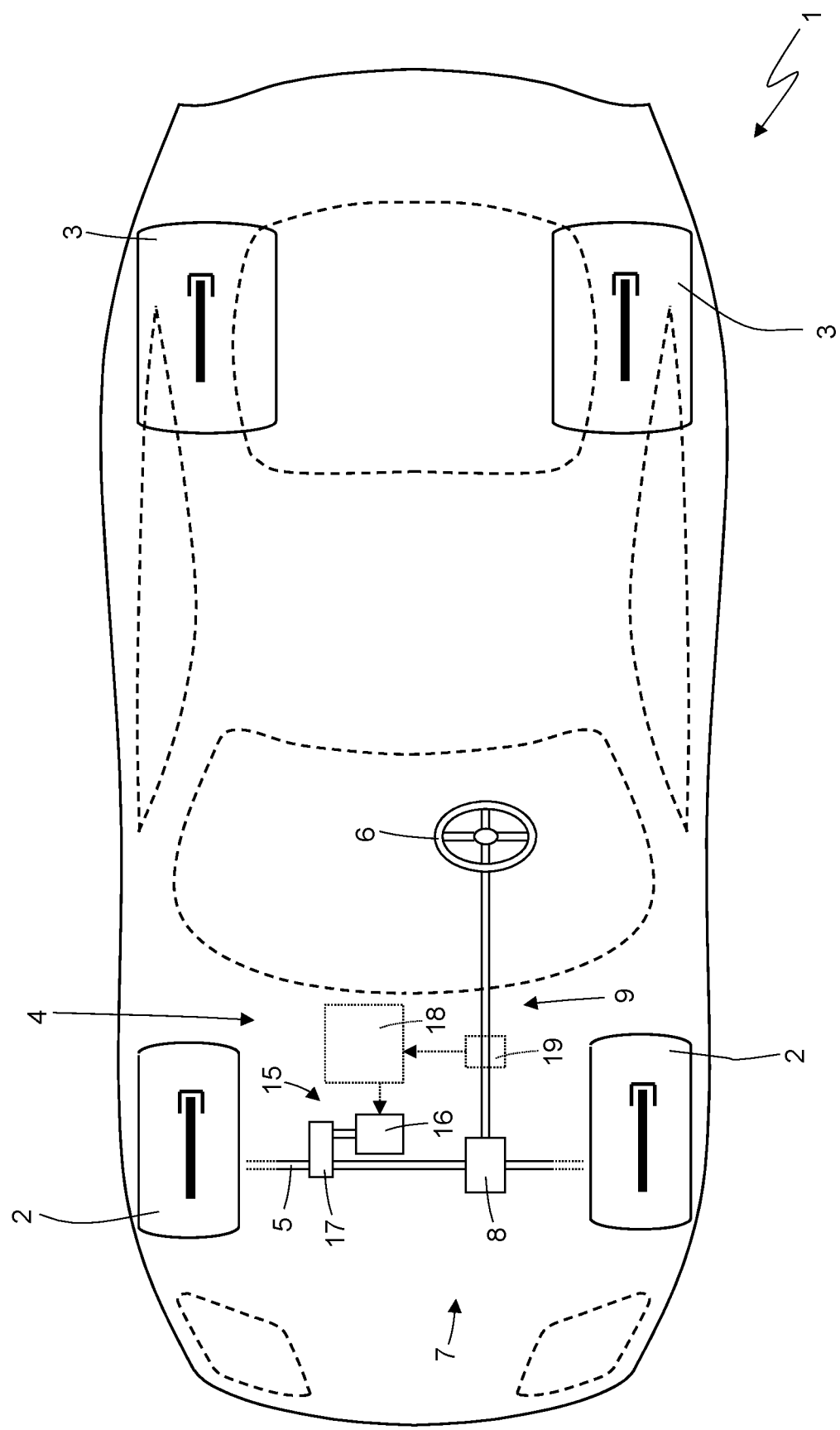
FIG. 1 is a schematic plan view of a road vehicle implementing the control method according to the invention.

In FIG. 1, number 1 indicates, as a whole, a road vehicle provided with two front wheels 2 and two rear drive wheels 3, which receive the torque from a powertrain system.

The road vehicle 1 comprises a steering system 4, which fulfils the function of controlling the steering angle, namely the angle existing between the direction of the front wheels 2 (i.e. the plane of rotation of the front wheels 2) and the longitudinal axis of the road vehicle 1.

The steering system 4 comprises a steering tie rod 5, which is arranged crosswise, is mechanically connected, at its opposite ends, to the hubs of the front wheels 2, and is mounted in an axially sliding manner in order to change the steering angle. Furthermore, the steering system 4 comprises a steering wheel 6, which is mounted in a rotary manner inside the passenger compartment and is mechanically connected to the steering tie rod 5 by means of a transmission device 7 so that the rotation of the steering wheel 6 determines an axial translation of the steering tie rod 5 and, hence, a corresponding variation of the steering angle. The transmission device 7 comprises a steering box 8, which receives, as an input, a rotary movement coming from the steering wheel 6 and produces, as an output for the steering tie rod 5, a corresponding axial translation movement; by way of example, the steering box 8 has an inner mechanism having a rack-and-pinion gearset, a recirculating ball screw plus linkage, a screw-nut coupling plus linkage, a worm screw plus linkage, or others.

Figure 2:
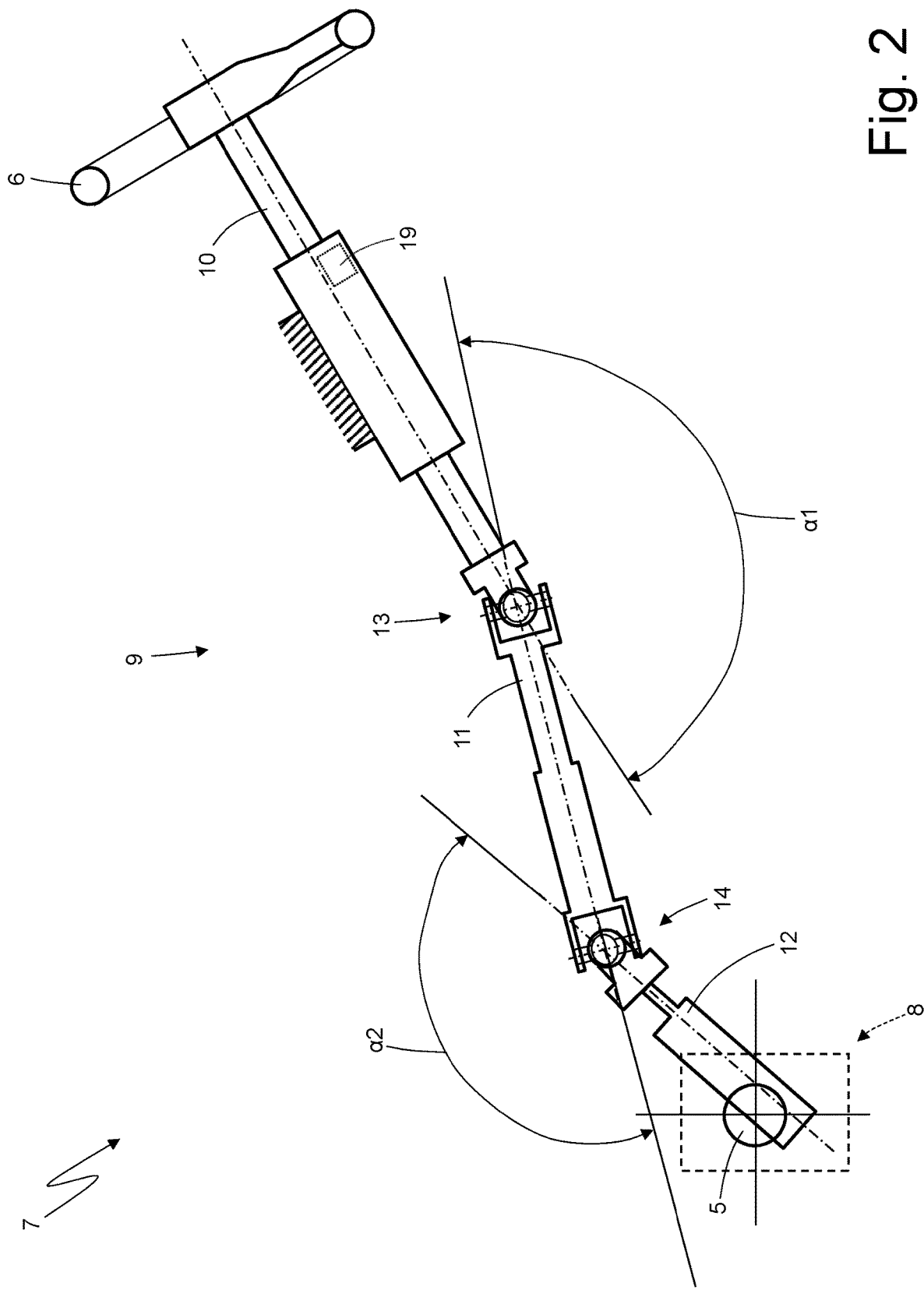
FIG. 2 is a schematic side view, with parts removed for greater clarity, of a transmission line of a steering system of the road vehicle of FIG. 1.

According to FIG. 2, the steering box 8 is connected to the steering wheel 6 by means of a transmission line 9 consisting of three transmission shafts 10, 11 and 12 connected to to one another by two Cardan joints 13 and 14. In particular, the transmission line 9 comprises an initial transmission shaft 10, which supports the steering wheel 6 and makes up the steering column of the steering wheel 6, and an intermediate transmission shaft 11, which, at an upper end, is connected to the initial transmission shaft 10 by means of the Cardan joint 13 and, at a lower end, is connected to a final transmission shaft 12 (which makes up the input of the steering box 8) by means of the Cardan joint 14.

According to FIG. 1, the steering system 4 comprises a servo-assistance device 15, which applies to the steering tie rod 5 a variable servo-assistance force, which reduces the force needed to rotate the steering wheel 6. The servo-assistance device 15 comprises an electric actuator 16 and a transmission 17, which mechanically connects the electric actuator 16 to the steering tie rod 5.

Finally, the steering system 4 comprises an electronic control unit 18 ("ECU"), which is designed to control the electric actuator 16 of the servo-assistance device 15, namely is designed to change, in the ways described hereinafter, the servo-assistance torque applied by the servo-assistance device 15 to the steering tie rod 5. The control unit 18 can physically consist of one single device or of different devices separated from one another and communicating with one another through the CAN network of the road vehicle 1. The control unit 18 is connected to a sensor 19, which detects in real time the angular position of the steering wheel 6 and the torque applied by the driver to the steering wheel 6; it should be pointed out that the sensor 19 can be mechanically coupled to any one of the transmission shafts 10, 11 and 12 of the transmission line 9 (by way of example, in FIG. 2 the sensor 19 is coupled to the initial shaft 10).

Figure 3:
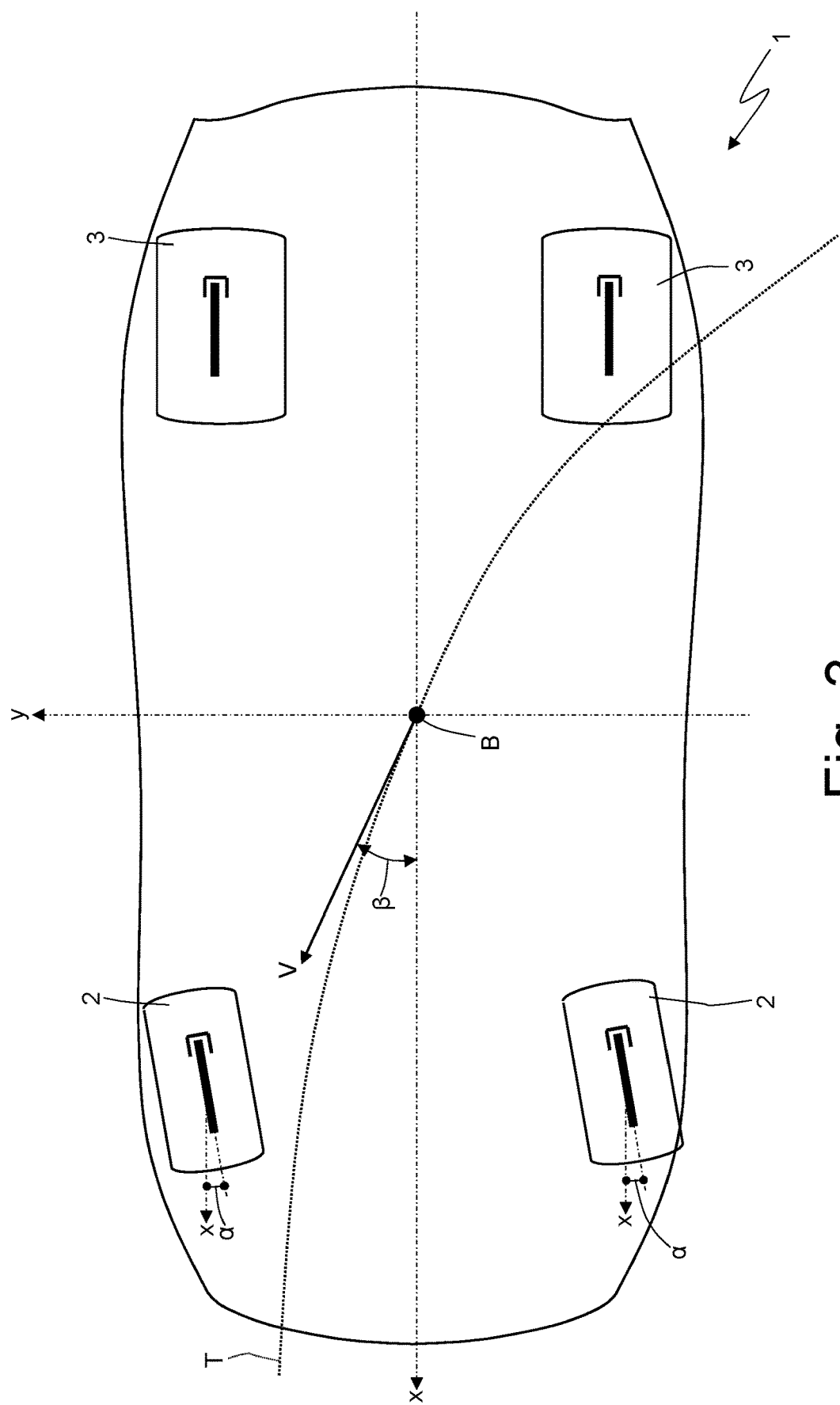
FIG. 3 is a schematic view of the road vehicle of FIG. 1 while driving along a curve, highlighting the trajectory, the steering angle of the front wheels, the driving speed and the attitude angle.

According to FIG. 3, when driving along a curve (namely, when the road vehicle 1 follows a curved trajectory T), the front steering wheels 2 have a steering angle α (i.e. the angle formed between the longitudinal axis x of the road vehicle 1 and the direction of the front wheels 2) other than zero and the road vehicle 1, as a whole, has an attitude angle β (i.e. the angle comprised between the longitudinal axis x of the road vehicle 1 and the direction of the driving speed V of the road vehicle 1 in the centre of gravity B) other than zero.

In use, the control unit 18 determines in a known manner the actual steering angle α (namely the real one, i.e. the one actually present in the road vehicle 1); for example, as there is a mechanical connection between the front wheels 2 and the transmission line 9 of the steering wheel 6, the control unit 18 can determine the actual steering angle α based on the measure detected by the sensor 19.

In use, the control unit 18 determines in a known manner the actual attitude angle β of the road vehicle 1. By way of example, the control unit 18 estimates the trajectory T followed by the road vehicle 1 using the measures provided in real time by a triple-axis gyroscope and by a GPS tracking unit; in particular, the trajectory T is determined by integrating twice in time the accelerations measured by the triple-axis gyroscope and the measures provided by the GPS tracking unit are used to cyclically cancel the position errors occurring during the integration process. Furthermore, the control unit 18 estimates the driving speed V of the road vehicle 1 in the centre of gravity B using the measures provided in real time by the triple-axis gyroscope; in particular, the speed V of the road vehicle 1 in the centre of gravity B is determined by integrating once in time the accelerations measured by the triple-axis gyroscope (making sure that the driving speed V of the road vehicle 1 in the centre of gravity B actually is tangent to the trajectory T followed by the road vehicle 1, otherwise, in case of a significant deviation, at least one further iteration of the calculation is carried out making corrections to the parameters used).

In use and when driving along a curve, the control unit 18 determines a desired (ideal, target) attitude angle $\beta_{TGT}$, which allows the performance (i.e. the driving speed along the curve) to be maximized, keeping at the same time the vehicle 1 in stable conditions (i.e. completely safe conditions).

In use and when driving along a curve, the control unit 18 determines a desired (ideal, target) steering angle $\alpha_{TGT}$, which allows the performance (i.e. the driving speed along the curve) to be maximized, keeping at the same time the vehicle 1 in stable conditions (i.e. completely safe conditions). According to a preferred embodiment, the control unit 18 determines the desired steering angle $\alpha_{TGT}$ based on the desired attitude angle $\beta_{TGT}$, on the actual steering angle β and also on the actual steering angle α; in particular, the control unit 18 tries and pursue (obtain) the desired attitude angle $\beta_{TGT}$ starting from the actual steering angle β and (also) using the steering of the front wheels 2 (i.e. the desired steering angle $\alpha_{TGT}$). In determining the desired steering angle $\alpha_{TGT}$ it is preferable to also take into account the "starting pint", namely the actual steering angle α, so as not to establish a desired steering angle $\alpha_{TGT}$ that is too far from the actual steering angle α (also taking into account the fact that the decision on how to change the actual steering angle α is always made by the driver, who is the only one responsible for controlling the steering wheel 6 and, as a consequence, it is unrealistic to assume that the driver might decide to completely change, in a short time, the actual steering angle α).

The control unit 18 can change the servo-assistance torque applied by the servo-assistance device 15 to the steering system 4 based on the actual steering angle α and on the desired steering angle $\alpha_{TGT}$, so that the servo-assistance torque that is applied when the steering wheel 6 is rotated by the driver (and by the driver only) in a first direction to change the actual steering angle α causing it to approach the desired steering angle $\alpha_{TGT}$ is greater than the servo-assistance torque that is applied when the steering wheel 6 is rotated by the driver (and by the driver only) in a second direction, which is opposite to the first direction, to change the actual steering angle α causing it to distance itself from the desired steering angle $\alpha_{TGT}$.

In other words, when the steering wheel 6 is rotated by the driver (and by the driver only) in the first direction to change the actual steering angle α causing it to approach the desired steering angle $\alpha_{TGT}$ (i.e. to reduce the difference between the actual steering angle α and the desired steering angle $\alpha_{TGT}$), a first servo-assistance torque is applied, whereas, when the steering wheel 6 is rotated by the driver (and by the driver only) in a second direction, which is opposite to the first direction, to change the actual steering angle α causing it to distance itself from the desired steering angle $\alpha_{TGT}$ (i.e. to increase the difference between the actual steering angle α and the desired steering angle $\alpha_{TGT}$), a second servo-assistance torque is applied, which is smaller than the first servo-assistance torque.

According to a possible non-limiting embodiment, the ratio between the first servo-assistance torque and the second servo-assistance torque is variable and depends on the difference between the actual steering angle α and the desired steering angle $\alpha_{TGT}$. In particular, the ratio between the first servo-assistance torque and the second servo-assistance torque increases as the difference between the actual steering angle α and the desired steering angle $\alpha_{TGT}$ increases; therefore, the more different the actual steering angle α is from the desired steering angle $\alpha_{TGT}$, the "lighter" the steering wheel 6 is when turning (due to the action of the driver, who still remains the only one allowed to decide on where the vehicle 1 is headed) in the the first direction, which reduces the difference between the actual steering angle α and the desired steering angle $\alpha_{TGT}$, and the "heavier" the steering wheel 6 is when turning (due to the action of the driver, who still remains the only one allowed to decide on where the vehicle 1 is headed) in the the second direction, which increases the difference between the actual steering angle α and the desired steering angle $\alpha_{TGT}$.

In the particular case in which the actual steering angle α is equal to the desired steering angle $\alpha_{TGT}$ (namely, the difference between the two steering angles α and $\alpha_{TGT}$ is smaller, in absolute value, than a predetermined threshold), no servo-assistance variation is applied to what already determined by the control unit 18 as base assistance, as there is no manoeuvre to be "suggested" to the driver; as a consequence, when the actual steering angle α is equal to the desired steering angle $\alpha_{TGT}$, a same servo-assistance torque is applied in both rotation directions of the steering wheel 6. According to a different embodiment, in the particular case in which the actual steering angle α is equal to the desired steering angle $\alpha_{TGT}$ (namely, the difference between the two steering angles α and $\alpha_{TGT}$ is smaller, in absolute value, than a predetermined threshold), the second (smaller) servo-assistance torque is applied in both rotation directions of the steering wheel 6, so that the steering wheel 6 is "heavy"

when turning (due to the action of the driver, who still remains the only one allowed to decide on where the vehicle 1 is headed) in both direction in order to "suggest" to the driver not to turn the steering wheel 6.

It should be pointed out that the servo-assistance torque applied by the servo-assistance device 15 to the steering system 4 always is greater than or equal to zero (i.e. it never is negative), namely it always tends to reduce to effort to be applied on the steering wheel 6 in order to turn the steering wheel 6 and never increases the effort to turn the steering wheel 6 compared to the mechanical stress that should have been applied in the absence of assistance. In other words, the assistance is regulated in the two directions in the neighbourhood of the base assistance level, which is usually ensured by a driver assistance device.

This regulation also requires the level of variation of the servo-assistance torque applied by the servo-assistance device 15 to the steering system 4 to always be an "aid" (which can be more or less significant and could, if necessary, be cancelled) aimed at the sole assistance of the driver; hence, the level of variation of the servo-assistance torque applied by the servo-assistance device 15 to the steering system 4 is such that it never takes the place of the driver in turning the steering wheel 6 contrary to the will of the driver.

Operating as described above, the driver always remain fully in control of the steering wheel 6, which never tuns "by itself" (provided that there are no forces acting upon the front wheels 2 from the outside) following the action of the servo-assistance device 15. In other words, the servo-assistance device 15, when needed, delivers an asymmetrical servo-assistance torque in the two rotation directions of the steering wheel 6, so that the steering wheel 6 is "light" when turning in the first direction, which reduces the difference between the actual steering angle $\alpha$ and the desired steering angle $\alpha_{TGT}$, and, on the other hand, is "heavy" when turning in the second direction, which increases the difference between the actual steering angle $\alpha$ and the desired steering angle $\alpha_{TGT}$; however, it is always the driver who has to turn, with the arms, the steering wheel 6 and is completely free to choose whether to follow or ignore the "suggestions" received from the control unit 18 through the asymmetrical variation of the servo-assistance torque.

It is evident the the driver assistance method described above has its preferred application when driving along a curve and, in particular, when driving out of a curve, which is when, due to the application of a torque to the rear drive wheels 3, it is natural to trigger a tendency to develop oversteering conditions. However, the driver assistance method described above is not applicable (regardless of whether the road vehicle 1 is or is not driving along a curve) to all those cases in which a difference between the actual attitude angle $\beta$ and the desired attitude angle $\beta_{TGT}$ determines a desired steering angle $\alpha_{TGT}$ that is (significantly) different from the actual steering angle $\alpha$.

The embodiments described herein can be combined with one another, without for this reason going beyond the scope of protection of the invention.

The driver assistance method described above has different advantages.

First of all, the driver assistance method described above allows the driver to (safely) approach the limits of the road vehicle 1, especially when driving along a curve, since the driver receives suggestions on how to rotate the steering wheel 6 in a very clear and intuitive, though not invasive and pressing manner.

Furthermore, the assistance method described above leaves the driver fully in control of the steering wheel 6, without ever forcing anything upon him/her; in this way, the driver never feels "forced" and always feels like he/she has full control of the road vehicle 1.

Finally, the driver assistance method described above is extremely simple and economic to be implemented, since it uses physical components that are already present in a conventional steering system, hence without any cost burden from the "hardware" point of view. Also from a "software" point of view, the method described above does not require either a significant calculation ability or a large memory space.

LIST OF THE REFERENCE NUMBERS OF THE FIGURES 1 vehicle
2 front wheels
3 rear wheels
4 steering system
5 control shaft
6 steering wheel
7 transmission device
8 steering box
9 transmission line
10 initial transmission shaft
11 intermediate transmission shaft
12 final transmission shaft
13 upper Cardan joint
14 lower Cardan joint
15 servo-assistance device
16 electric actuator
17 transmission
18 control unit
19 sensor
T trajectory
V driving speed
B centre of gravity
$\alpha$ steering angle
$\beta$ attitude angle
x longitudinal axis
y transverse axis

The invention claimed is:

1. An assistance method for the driver assistance of a road vehicle (1);
the road vehicle (1) comprises: a pair of front steering wheels (2) and a steering system (4), which adjusts the steering angle ($\alpha$) of the front wheels (2) and is provided with a steering wheel (6), which can be operated by a driver, and with a servo-assistance device (15), which applies a servo-assistance torque to the steering system (4), which is only aimed at reducing the effort requested to a driver to turn the steering wheel (6) without ever turning the steering wheel (6) independently of or autonomously from the action of the driver;
the assistance method comprises the steps of:
determining an actual steering angle ($\alpha$) of the front wheels (2);
determining a desired steering angle ($\alpha_{TGT}$) of the front wheels (2); and
changing the servo-assistance torque applied by the servo-assistance device (15) to the steering system (4) based on the actual steering angle ($\alpha$) and on the desired steering angle ($\alpha_{TGT}$), so that the servo-assistance torque that is applied when the steering wheel (6) is rotated, exclusively by the driver, in a first direction to change the actual steering angle ($\alpha$) causing it to approach the desired steering angle ($\alpha_{TGT}$) is greater than the servo-assistance torque that is applied when the steering wheel (6) is rotated, exclusively by the driver, in a second direction, which is opposite to the first direction, to change the actual steering angle ($\alpha$) causing it to distance itself from the desired steering angle ($\alpha_{TGT}$).

2. The assistance method according to claim 1, wherein:
when the steering wheel (6) is rotated, exclusively by the driver, in the first direction to change the actual steering angle ($\alpha$) causing it to approach the desired steering angle ($\alpha_{TGT}$), a first servo-assistance torque is applied; and when the steering wheel (6) is rotated, exclusively by the driver, in the second direction, which is opposite to the first direction, to change the actual steering angle ($\alpha$) causing it to distance itself from the desired steering angle ($\alpha_{TGT}$), a second servo-assistance torque is applied, which is smaller than the first servo-assistance torque.

3. An assistance method according to claim 2, wherein the ratio between the first servo-assistance torque and the second servo-assistance torque is variable and depends on the difference between the actual steering angle ($\alpha$) and the desired steering angle ($\alpha_{TGT}$).

4. The assistance method according to claim 3, wherein the ratio between the first servo-assistance torque and the second servo-assistance torque increases as the difference between the actual steering angle ($\alpha$) and the desired steering angle ($\alpha_{TGT}$) increases.

5. The assistance method according to claim 2, wherein, when the actual steering angle ($\alpha$) is equal to the desired steering angle ($\alpha_{TGT}$), the second servo-assistance torque is applied in both rotation directions of the steering wheel (6).

6. The assistance method according to claim 1, wherein, when the actual steering angle ($\alpha$) is equal to the desired steering angle ($\alpha_{TGT}$), a same servo-assistance torque is applied in both rotation directions of the steering wheel (6).

7. The assistance method according to claim 1 and comprising the further steps of:
determining a desired attitude angle ($\beta_{TGT}$) of the road vehicle (1), namely the angle comprised between a longitudinal axis (x) of the road vehicle (1) and the direction of the driving speed (V) of the road vehicle (1) in the centre of gravity (B); and
determining the desired steering angle ($\alpha_{TGT}$) based on the desired attitude angle ($\beta_{TGT}$).

8. The assistance method according to claim 7 and comprising the further steps of:
determining an actual attitude angle ($\beta$) of the road vehicle (1); and
determining the desired steering angle ($\alpha_{TGT}$) based on the difference between the desired attitude angle ($\beta_{TGT}$) and the actual attitude angle ($\beta$).

9. The assistance method according to claim 1, wherein the desired steering angle ($\alpha_{TGT}$) is determined also based on the actual steering angle ($\alpha$).

10. The method according to claim 1, wherein the servo-assistance torque applied by the servo-assistance device (15) to the steering system (4) is always greater than or equal to zero, namely it always tends to reduce the effort to be applied by the driver to the steering wheel (6) to rotate the steering wheel (6).

11. The assistance method according to claim 1, wherein the servo-assistance device (15) of the steering system (4) never takes the place the driver in turning the steering wheel (6) and, therefore, never applies any rotation to the steering wheel (6) independently of or autonomously from the action of the driver.

12. The assistance method according to claim 1, wherein the servo-assistance device (15) of the steering system (4) never applies any rotation to the steering wheel (6) independently of or autonomously from the action of the driver.

* * * * *